March 2, 1937. J. H. SHAFNER 2,072,652
HEAT TRANSFER APPARATUS
Filed Dec. 28, 1931
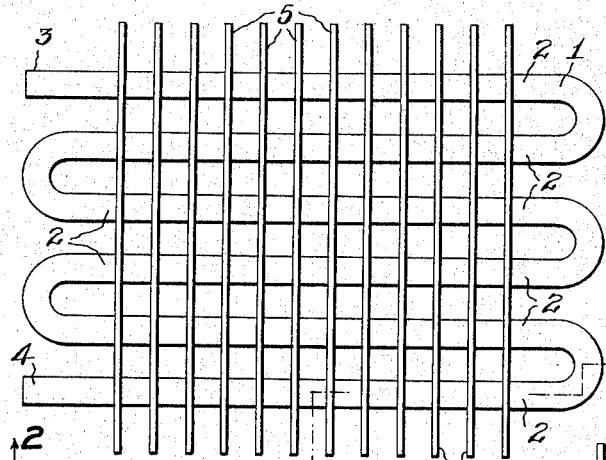
FIG. 1.
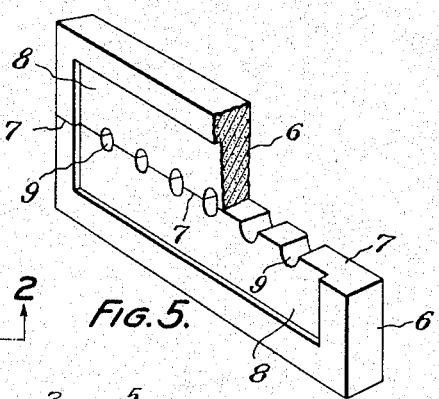
FIG. 5.
FIG. 2.
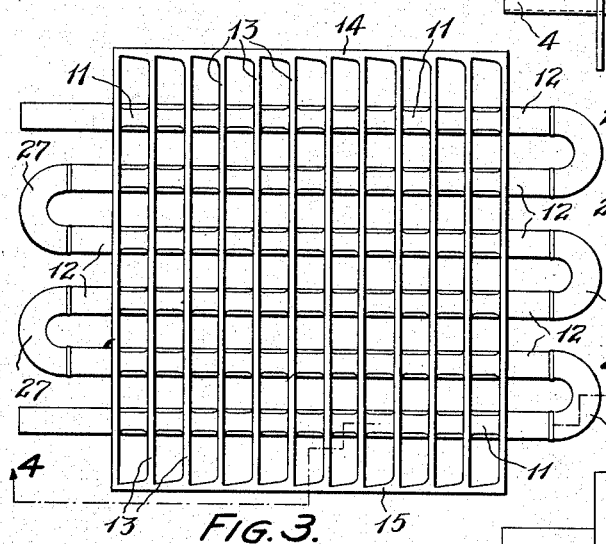
FIG. 3.
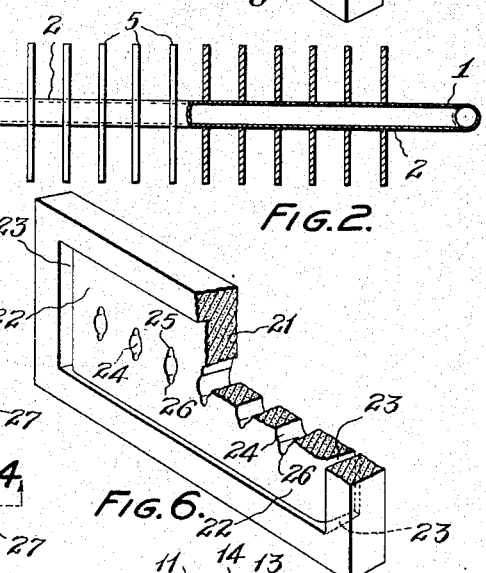
FIG. 6.
FIG. 4.
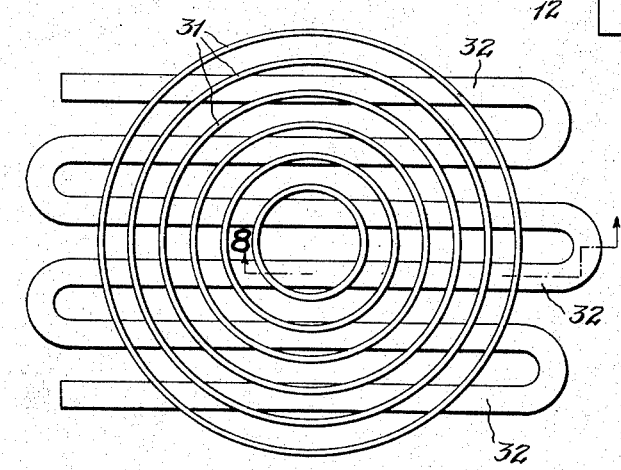
FIG. 7.
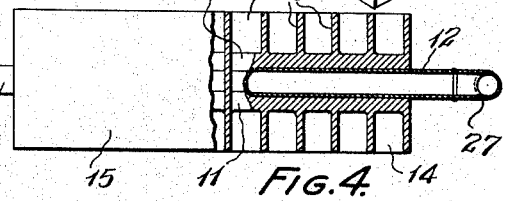
FIG. 8.
INVENTOR:
JEROLD H. SHAFNER
BY Saywell & Wesseler
ATTORNEYS Patented Mar. 2, 1937

2,072,652

UNITED STATES PATENT OFFICE 2,072,652

HEAT TRANSFER APPARATUS

Jerold H. Shafner, Euclid Village, Ohio, assignor to The National Bronze & Aluminum Foundry Company, Cleveland, Ohio, a corporation of Ohio Application December 28, 1931, Serial No. 583,430

2 Claims. (Cl. 257—255)

This invention, as indicated, relates to a heat transfer apparatus. More particularly, the apparatus comprises a series of tube sections directly interengaged with fins having heat transfer functions as well as constituting structural elements of the device. The apparatus also includes a series of tube sections, preferably parallel and positioned in a single plane, having a series of thin, flat radiating fins arranged to intersect and engage across said tubes, and preferably to be positioned in parallel relation transversely to the direction of said tube sections and integrally connected, preferably at a central position, with said tube sections so as to assist in heat transfer to or from the tubular members.

The invention also includes the method of making a structure of the type referred to through the use of a plurality of separate mold sections which, when juxtapositioned, provide a complete mold for an apparatus embodying any desired number of elements. The invention also has in view the provision of separable mold sections, which permits the building up of a heat transfer structure on a series of parallel tube sections formed of a single length of tubing bent back and forth upon itself, so as to provide at an intermediate position a series of parallel sections positioned in substantially a single plane.

It has heretofore been proposed to cast an aluminum body about tubing and provide radiating fins upon the exterior surface of such aluminum body to dissipate the heat. This is shown in the British patent to Schiele et al., 1,474, January 23, 1900. It has been found, however, that by directly casting fins of suitable metal, such as aluminum, or the like, so as to intersect and firmly engage a series of parallel tubes or tube sections, that less material is required in manufacturing the heat transfer apparatus and at the same time greater space is provided for the passage of air about the several parts and the rate of heat transfer is thereby greatly increased. Thus, there is brought about both economy of material in producing the structure as well as increased efficiency of operation of the device.

The principal object of the present invention is to provide a heat transfer structure having a minimum number of parts and having adequate space for the passage of air there-through so that the maximum efficiency of heat transfer may be brought about.

Another object of the invention is to provide a structure having a series of tube sections to contain one element to be conditioned as to temperature and to support directly thereon a series of fins of suitable heat transfer characteristics, such fins also serving as rigid structural supporting elements of the apparatus.

Another object of the invention is to provide a series of mold sections adapted to be assembled in any required number to form a multiple series of fins and permit the casting of an integral structure with tube sections and fins of the type herein shown and described, of any desired length and heat transfer capacity.

Another object of the invention is to provide a series of separable mold sections and provide for the casting of fins upon a tubular structure bent back and forth upon itself, so as to provide a series of substantially parallel tube sections.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain structures embodying the invention of producing the same, such disclosed means constituting, however, but several of various applications of the principles of the invention.

In said annexed drawing:

Fig. 1 is a top plan view of an apparatus embodying the principle of the invention; Fig. 2 is a side elevation, partly in section, of the apparatus shown in Fig. 1, taken along the line 2—2 shown in Fig. 1; Fig. 3 is a view similar to Fig. 1 showing a modified form of the apparatus; Fig. 4 is a side elevation, partly in section, of the apparatus shown in Fig. 3, taken along the line 4—4 shown in Fig 3; Fig. 5 is a perspective view, partly in section, showing a separable mold section for use in multiple for forming the structure illustrated in Fig. 1; Fig. 6 is a view similar to Fig. 5, showing a mold section for use in multiple to produce the device of the type illustrated in Figs. 3 and 4; Fig. 7 is a top plan view illustrating a modified form of heat transfer apparatus; and Fig. 8 is a partial section of the structure shown in Fig. 7 taken along the line 8—8 shown in Fig. 7.

The form of apparatus shown in Figs. 1 and 2 comprises a tube 1 bent back and forth upon itself so as to provide a series of parallel sections 2, lying in a single plane and preferably having inlet and outlet portions, 3, 4, of such tube on one side of the apparatus, although, if desired, such terminal elements of such tubing may be otherwise disposed. Across said parallel series of tube lengths a series of thin fins or heat transfer plates 5 is disposed in parallel relation, said plates being engaged over the parallel tube sections and being held in firm relation thereto by reason of the shrinkage of the metal upon such tube sections through cooling after the casting operation.

While tube sections are shown in a single plane and parallel to each other and fins are shown as crossing them at right angles, it is not intended to limit the claims to the particular structure shown and described, as a diagonal or other disposition of such elements may be found desirable.

The device shown in Fig. 1 may be provided with parallel end walls shown in Fig. 3, thus making the structure of substantially rectangular outline and increasing the rigidity of same as well as providing end walls to confine any air passing through the apparatus to the area wherein the heat transfer is desired and preventing the divergence of air currents laterally.

As has been indicated, the tubing used in the apparatus may comprise a single tube bent back and forth upon itself so as to present a plurality of parallel tube sections lying in a single plane, or the device may be formed of a series of parallel tubes to the ends of which other connections may be made such as short return bends or U-shaped connections attached so as to provide a continuous passageway through all the tubular sections throughout the apparatus, as will be presently described.

Where the tubing in place of comprising a series of short sections, is in the form of a single piece of tubing bent back and forth upon itself so as to provide a series of sections parallel to each other and preferably lying in a single plane, the apparatus may be formed by using a series of separable mold sections 6, such as is shown in Fig. 5. Each mold section is made separable along a transverse line so as to provide a parting plane 7, intersecting the parallel tube lengths. Each mold section is formed with a depression 8 on one side to form the casting cavity for the fin, and has a series of apertures 9 extending therethrough along the parting line to receive the tube sections. As many mold sections as are necessary to make the desired length of apparatus are assembled over the parallel tube sections and held closely together and suitable gates and runners, as is well understood in the foundry practice, are provided to permit the casting of the parallel plates or the fins across such parallel tube sections.

The form of apparatus shown in Figs. 3 and 4 is somewhat similar to that shown in Figs. 1 and 2, and may be formed in substantially the same way with separable mold sections, which in such case would have to be provided with apertures extending through such sections adjacent the ends of the depressed area forming the fin casting cavity, to provide for the end walls of the structure. However, it has been found that an increased efficiency of operation for the apparatus can be obtained by providing shallow vertical ribs or fins 11 formed on each side of the tubes 12 between the transverse fins 13. These transverse fins are preferably provided with end walls 14, 15, to serve as air directing means and also to strengthen the structure as a whole.

It will be noted that the shallow ribs 11 are about one-fourth the height of the transverse fins 13 and the end walls 14, 15.

Where it is desired to form an apparatus of the character shown in Figs. 3 and 4, the mold members 21 may be formed without a central parting line in order to avoid uneven surfaces, and such members are each provided with a depression, 22, for forming the casting cavity for the transverse fin and with a passageway 23 extending through the mold member at each end of such depression so as to form the respective end walls 14, 15 of the apparatus.

Along a central transverse line apertures 24 for the tube sections are provided, said apertures being recessed on the upper and lower sides to provide casting cavities 25 and 26, for the upper and lower shallow ribs on the tube sections between the transverse fins. These cavities are rounded at their ends, away from the tube surface so as to somewhat stream-line the shallow ribs and provide for reduced resistance to the passage of air through the apparatus.

In the form of mold section shown in Fig. 6 no parting line is provided. To form the structure shown in Figs. 3 and 4, the required number of mold sections similar to that shown in Fig. 6 is assembled and short straight tube sections 12 are then forced endwise through the respective apertures 24. The metal casting is then made through the use of the gates and runners, and thereafter suitable end connections are made to the short straight tube connections. This connection may be in the form of a manifold or in the form of a series of short return bends or fittings 27, as is shown in Figs. 3 and 4. These fittings may be secured in any suitable manner to the straight tube sections as by soldering, welding, or the like.

Where it is desired to confine the air to certain concentric passageways about the tubing, it may be found desirable to make the apparatus in the form shown in Figs. 7 and 8 wherein the heat transfer fins are made of thin walled circular or elliptical members 31, intersecting and engaged upon a series of parallel tube lengths 32, such concentric circular fin members being firmly engaged over each of the tubes they intersect and being securely held thereon through the shrinkage of the metal upon the metal of the tubing.

The metal used in the heat transfer apparatus may be made of any desired character according to the use to which the apparatus is to be put. The tubing may be of steel and the fins engaged thereover may be of gray iron, or copper, or aluminum, and the tubing itself may be of steel, copper, aluminum alloy, or any desired metal, the melting point of the tubing preferably being higher than the melting point of the fins, and the heat transfer capacity of the fins preferably being higher than that of the tubing.

An apparatus having a single length of tubing bent back and forth upon itself, so as to provide a series of parallel sections, and having a series of thin aluminum fins crossing such parallel tube members, formed of steel or copper tubing, in closely spaced relation, has been found very effective in use as a condenser for a refrigerator system showing an extremely high efficiency. It has also been found that a device of this character is very well adapted for use as a heating unit.

Because of the fact that the tube sections carrying one element to be conditioned as to temperature, transfer heat directly to or from the fins and have no excess of metal engaged over them as would be the case if they were embedded in a casting, the apparatus shows an unusually high efficiency.

As has been stated, the transverse fins serve not only as heat transfer means but also as structural members of the frame or grid forming the heat transfer apparatus; the shallow intermediate fins also serve as integral frame members as well as heat transfer means. Thus the structure provides a honeycomb type of device made up of but two elements—the series of tube sections and the series of heat transfer fins. The tube sections are substantially free of metal coating at the sides, thereby providing the maximum air space directly through the device. The transverse fins, as well as the shallow fins, may be tapered toward their free edges to still further reduce resistance to the passage of air through the device. Laboratory tests have established for the apparatus above described a rating of very high efficiency and a relatively small unit may be used for heavy duty service.

Other modes of applying the principle of my invention may be employed instead of the one explained, change being made as regards the structure and method herein disclosed, provided the means or steps stated by any of the following claims or the equivalent of such stated means be employed.

I therefore particularly point out and distinctly claim as my invention:

1. A heat transfer apparatus formed as an integral structure comprising a series of tube sections of metal of relatively high melting point positioned in substantially parallel relation in a single plane, a series of edgewise positioned thin plate-like fins of lower melting point and higher inherent heat transfer capacity than said tube sections spaced from each other and intersecting and engaged by casting upon each of said tube sections and projecting to at least one side thereof, and forming combined frame members and heat transfer elements, and a series of shallow reinforcing fins mounted on said tube sections intermediate said first-named fins and cast integrally with and merging with the respective first-named fins at each end whereby large surfaces of said tube sections will be exposed intermediate said respective series of fins.

2. A heat transfer unit formed of a series of narrow concentric circular spaced cast metal plates set edgewise of high heat transfer capacity with their top and bottom edges lying in the same planes respectively, and a continuous tubular member, bent back and forth upon itself to provide substantially parallel sections, engaged in a central plane of said plates, with the metal of the plates at the points of intersection with said tubular member in a state of internal compression upon said tube sections, said tubular member being metal of a relatively lower capacity for heat transfer, and said tubular member having free exposed areas between the plates.

JEROLD H. SHAFNER.